United States Patent
Brown et al.

(10) Patent No.: US 10,902,616 B2
(45) Date of Patent: Jan. 26, 2021

(54) SCENE EMBEDDING FOR VISUAL NAVIGATION

(71) Applicant: Nvidia Corporation, Santa Clara, CA (US)

(72) Inventors: Abel Karl Brown, Dumfries, VA (US); Robert Stephen DiPietro, Baltimore, MD (US)

(73) Assignee: Nvidia Corporation, Santa Clara, CA (US)

( * ) Notice: Subject to any disclaimer, the term of this patent is extended or adjusted under 35 U.S.C. 154(b) by 115 days.

(21) Appl. No.: 16/216,458

(22) Filed: Dec. 11, 2018

(65) Prior Publication Data

US 2020/0051252 A1    Feb. 13, 2020

Related U.S. Application Data

(60) Provisional application No. 62/718,302, filed on Aug. 13, 2018.

(51) Int. Cl.
*G06T 7/246* (2017.01)
*G06K 9/00* (2006.01)
(Continued)

(52) U.S. Cl.
CPC ........... *G06T 7/248* (2017.01); *G05D 1/0088* (2013.01); *G05D 1/0221* (2013.01);
(Continued)

(58) Field of Classification Search
CPC combination set(s) only.
See application file for complete search history.

(56) References Cited

U.S. PATENT DOCUMENTS 9,285,805 B1* 3/2016 Pollock ............... G05D 1/0212
2009/0263009 A1* 10/2009 Krishnaswamy .... G05D 1/0253
382/154

(Continued)

OTHER PUBLICATIONS

Abhijeet Kumar, "Towards View-Invariant Intersection Recognition from Videos using Deep Network Ensennbles", 2018 IEEE/RSJ International Conference on Intelligent Robots and Systems (IROS), Madrid, Spain, Oct. 1-5, 2018, pp. 1053-1056.*

(Continued)

*Primary Examiner* — Omar S Ismail
(74) *Attorney, Agent, or Firm* — Hogan Lovells US LLP

(57) ABSTRACT

Navigation instructions are determined using visual data or other sensory information. Individual frames can be extracted from video data, captured from passes through an environment, to generate a sequence of image frames. The frames are processed using a feature extractor to generate frame-specific feature vectors. Image triplets are generated, including a representative image frame (or corresponding feature vector), a similar image frame adjacent in the sequence, and a disparate image frame that is separated by a number of frames in the sequence. The embedding network is trained using the triplets. Image data for a current position and a target destination can then be provided as input to the trained embedding model, which outputs a navigation vector indicating a direction and distance over which the vehicle is to be navigated in the physical environment.

20 Claims, 10 Drawing Sheets

(51) Int. Cl.
*G06K 9/62* (2006.01)
*G05D 1/00* (2006.01)
*G05D 1/02* (2020.01)

(52) U.S. Cl.
CPC ....... *G05D 1/0231* (2013.01); *G06K 9/00744* (2013.01); *G06K 9/00765* (2013.01); *G06K 9/6256* (2013.01); *G06T 2207/10016* (2013.01); *G06T 2207/20081* (2013.01); *G06T 2207/20084* (2013.01); *G06T 2207/30241* (2013.01); *G06T 2207/30248* (2013.01)

(56) References Cited

U.S. PATENT DOCUMENTS

| | | | | |
|---|---|---|---|---|
| 2013/0182909 | A1* | 7/2013 | Rodriguez-Serrano | G06T 7/143 382/105 |
| 2014/0375493 | A1* | 12/2014 | Weisenburger | G06T 7/277 342/357.3 |
| 2016/0022125 | A1* | 1/2016 | Nicolau | A61B 5/062 600/424 |
| 2016/0086332 | A1* | 3/2016 | Chen | G06T 7/344 345/419 |
| 2016/0148433 | A1* | 5/2016 | Petrovskaya | G02B 27/01 345/633 |
| 2017/0098140 | A1* | 4/2017 | Wang | G06T 3/40 |

OTHER PUBLICATIONS

Abhijeet Kumar,"Towards View-Invariant Intersection Recognition from Videos using Deep Network Ensembles",2018 IEEE/RSJ International Conference on Intelligent Robots and Systems (IROS),Madrid, Spain, Oct. 1-5, 2018, pp. 1053-1056.*

Ondrej Miksik,"Efficient Temporal Consistency for Streaming Video Scene Analysis," 2013 IEEE International Conference on Robotics and Automation (ICRA) Karlsruhe, Germany, May 6-10, 2013, pp. 133-137.*

Leveraging Vision-Based Structure-from-Motion for Robust Integrated Land Vehicle Positioning Systems in Challenging GNSS Environments,31st International Technical Meeting of the Satellite Division of the Institute of Navigation (ION GNSS+2018), Miami, Florida, Sep. 24-28, 2018,pp. 3099-3109.*

Kumar et al., Towards View-Invariant Intersection Recognition from Videos using Deep Network Ensembles, Marked DRAFT Confidential. Limited Distribution. For review only., dated Mar. 2018.

Kumar et al., Towards View-Invariant Intersection Recognition from Videos using Deep Network Ensembles, dated Oct. 2018.

* cited by examiner

SCENE EMBEDDING FOR VISUAL NAVIGATION

CROSS-REFERENCE TO RELATED APPLICATIONS

This application claims priority to U.S. Provisional Patent Application Ser. No. 62/718,302, filed Aug. 13, 2018, and entitled "Scene Embedding for Visual Navigation," which is hereby incorporated herein in its entirety and for all purposes.

BACKGROUND

An increasing variety of vehicles and robots are utilizing autonomous navigation. Conventional approaches to navigating such objects are quite complicated and engineering intensive. For example, conventional computer vision utilizes customized algorithms that require specific situational knowledge to generate, where the knowledge includes specific feature signatures to be identified within the captured image data. Such approaches require significant effort to create, which limits their availability or ability to adapt to situational changes.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the navigation of vehicles or other objects in a physical environment. In particular, various embodiments provide for the determination of navigation instructions based on visual data or other sensory information. In various embodiments, video data is captured from one or more paths or passes through an environment. Individual frames can be extracted to generate a sequence of image frames. The frames can be processed using a feature extractor, such as a trained convolutional neural network (CNN), in order to generate lightweight representations of the image frames. The image frames can be used to train an embedding model, another CNN in some embodiments, for the environment. Image triplets can be generated, each triplet including a representative image frame selected at random, a similar image frame that is adjacent the representative frame in the sequence, and a disparate image frame that is separated from the representative frame by at least a minimum number of frames in the sequence. The embedding network is trained in part by analyzing the triplet loss values. Once a trained model is obtained, an image of a current position of a vehicle, as well as image data for a target destination, can be provided as input to the trained embedding model, which can output a navigation vector indicating a direction and distance over which the vehicle is to be navigated in the physical environment. Conventional object and obstacle navigation techniques can then be used to maneuver the vehicle in the environment, attempting to reach the destination by minimizing the remaining navigation vector.

Various other functions can be implemented within the various embodiments as well as discussed and suggested elsewhere herein.

Navigation generally refers to a process of monitoring and controlling movement of an object from one location to another. Navigational techniques involve locating the position of the object relative to known locations or patterns. While mammals possess the neural basis of a 'cognitive map' for keeping track of relative spatial locations and determining relative locations of specific other locations or destinations, navigation remains a substantial challenge for computer-based systems and other artificial agents, despite impressive advancements in deep neural networks and reinforcement-based learning.

Figure 1:
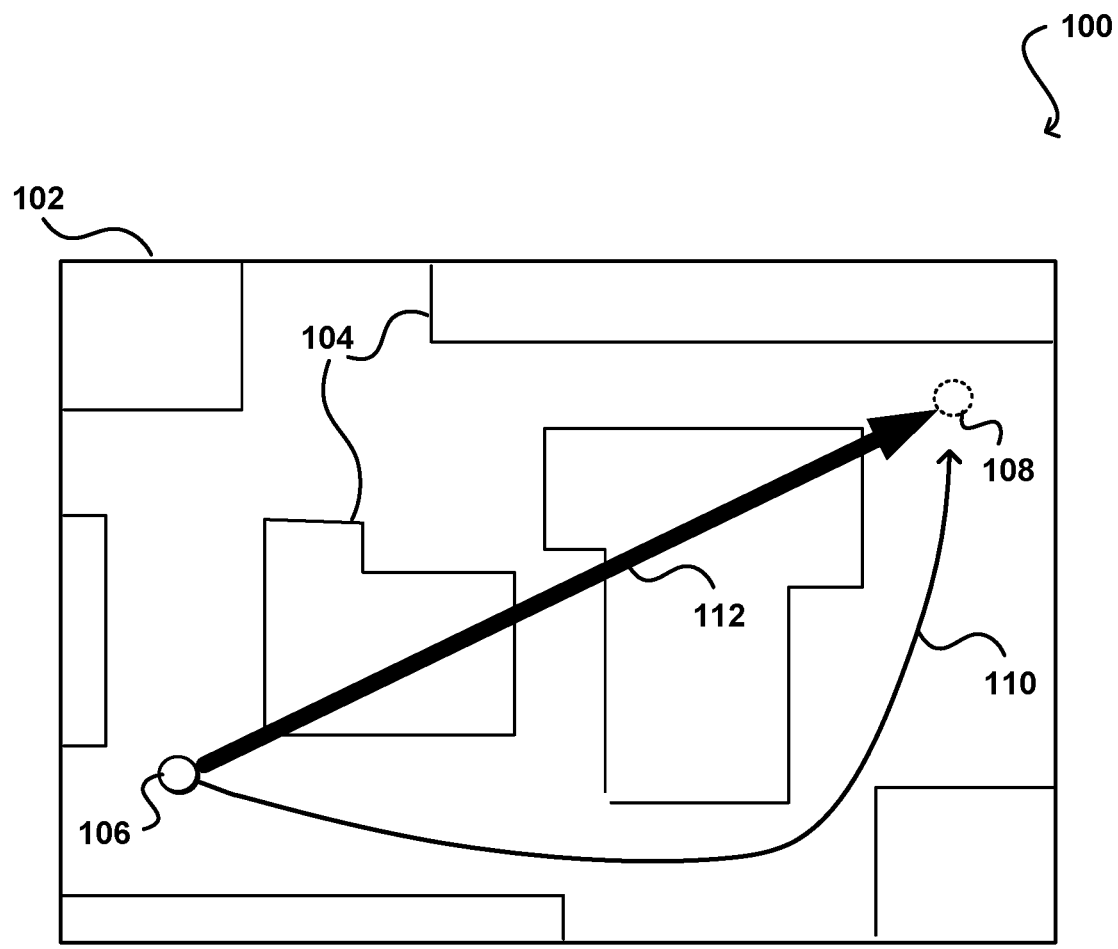
FIG. 1 illustrates an example environment in which an object can be navigated in accordance with various embodiments.

FIG. 1 illustrates an example environment 100 in which it can be desirable to navigate an object 106. This can include, for example, a robot to be navigated within a building or a vehicle to be navigated on city streets, among other such options. As illustrated, an object 106 can be located at a current location within the environment. It can be desirable to navigate the object to an intended destination location 108 within the environment. As illustrated, a subset of the environment may be determined to be navigable space, as may be defined by boundaries of physical objects 104 located within the environment. These boundaries may correspond to internal walls of furniture on the floor of a building, sidewalks or buildings along city streets, and the like. For aerial vehicles these boundaries may exist in three dimensions, and may include the tops of structures among other such options.

In order to navigate the object to its target destination location 108, many navigation systems will attempt to first determine a navigation vector 112 between the current location of the object 106 and the target destination location 108. This is often done using specific location information determined for the current location, or origin, and destination location. For many systems, this involves determining coordinates for the current location and for the destination location. This may require identifying the destination, then looking up the coordinates for that destination as previously determined. An actual navigation path 110 can then be calculated based on the information previously determined for that environment, including the navigable space and various boundaries along the way. As mentioned, however, conventional computer vision algorithms required customized algorithms that require specific situational knowledge to generate, where the knowledge included specific feature signatures to be identified within the captured image data.

Approaches in accordance with various embodiments can instead utilize sensory input relative to a physical environment in order to generate a topologically consistent representation of the environment. In particular, various embodiments utilize generalized vector space models that are created from temporal sequences of high-dimensional sensory input, such as a sequence of video frames captured within the physical environment. Such a temporal sequence can provide a spatial metric representative of the topologically of the environment, which can be used as a foundation for intelligent navigation. In various embodiments, deep convolutional neural networks (CNNs) are leveraged to extract feature vectors from visual sensory data. These feature vectors can be used to realize a low-dimensional embedding that captures the relatedness of visual cues within the physical environment. This scene embedding naturally facilitates localization and goal-directed vectors for navigation, while the learning process forms the basis of a more generic cognitive mapping approach for artificial agents.

Such approaches enable navigation of computer-controlled objects to be modeled more like the approaches used by various mammals. Mammals form representations that support motor-control, memory, and planning without social communication and requiring little to no supervision for perception. The fields of psychology and physiology refer to these representations as 'psychological spaces' that are constructed on the basis of experience and serve as organizing principals that impose unified perceptions upon otherwise diverse sensory inputs. These spaces are a simple topologic concept of 'relative space,' which designates a set of relations among objects or sensory inputs that are, in themselves, inherently non-spatial. Relative space does not exist independent of objects and expresses a topological geometry that defines spatial relations without direct measurement whereby any object is located only with respect to other objects.

A computational analogue of these relative spaces involves vector space models. Vector models often find use in information retrieval and natural language processing as methods to encode information according to some basis decomposition that may be derived from keywords or phrases that capture semantic variance. Vector space methods provide an encoding scheme to convert information into points in a high-dimensional space where nearness in the space reflects factors such as relevance, relatedness, or semantic similarity. More generally, these vector spaces can form an embedding which is a mathematical structure that imposes a relationship among objects. When an embedding imposes a relationship between objects using distance it creates a metric space which induces a topology. The mathematics of vector spaces on-demand are robust and tractable from an optimization perspective. In one example, there may be objects in a determined space that are labeled to be similar, and the metric learning task of determining a distance function that assigns small distance between similar objects can be formulated as a convex optimization problem. Similarly, it is possible to learn distance metrics using relative qualitative feedback of the form "A is closer to B than A is to C" by formulating the training process as a convex quadratic program through a maximum-margin approach. In various embodiments presented herein, the distance metric learning problem is formulated using a triplet-loss approach using a large-margin nearest-neighbor technique. Such techniques have been used in applications involving facial recognition, where objects share the same labels as their k-nearest neighbors and objects with different labels should be widely separated.

From a machine learning perspective, these methods can utilize supervised learning techniques in that "side-information" of similarity or neighbor labels are prescribed a priori. A learning metric process can be obtained that is unsupervised. To do this, the temporal correlations in visual sensory data can be leveraged by manipulating the data as a time-ordered sequence of images, where adjacent image pairs form positive training examples that exhibit both similarity of perceptual features and nearness of physical locality. Such a process can exploit temporal contiguity and constrain perceptual organization in both space and time. Such an organization might also facilitate an intuitive representation of temporal context.

Figure 2A:
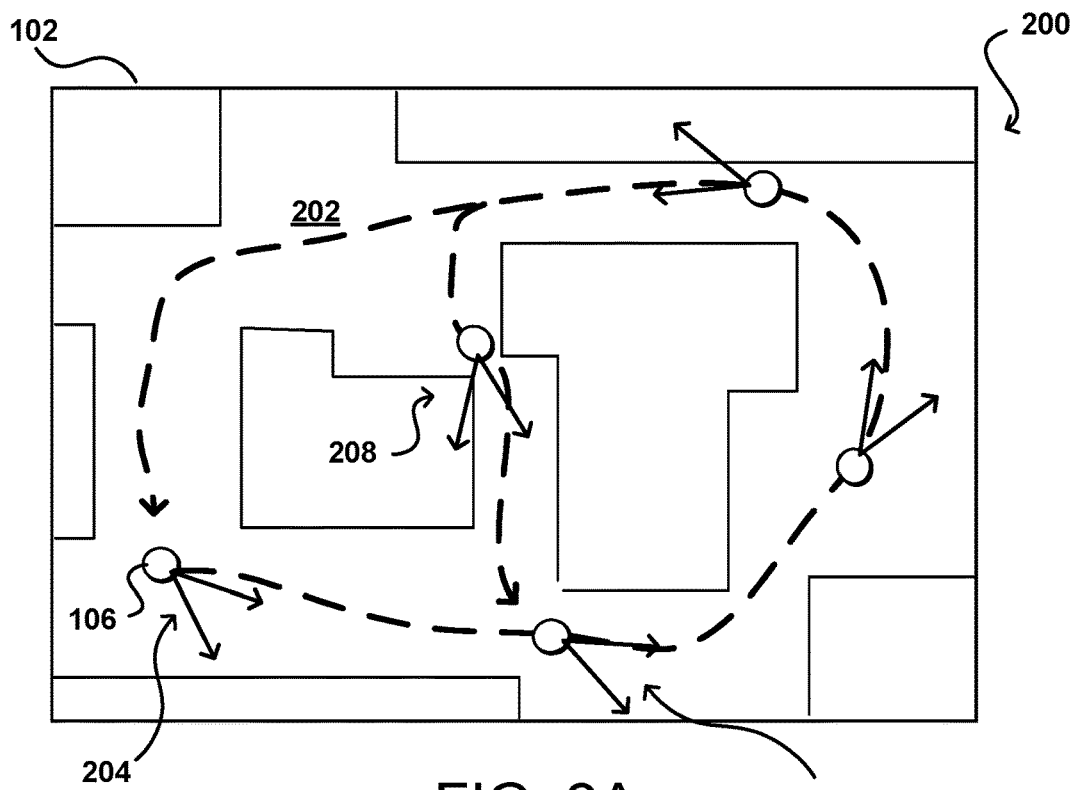
FIGS. 2A, 2B, 2C, and 2D illustrate a set of example training images that can be captured in a navigation environment in accordance with various embodiments.
Figure 2B:
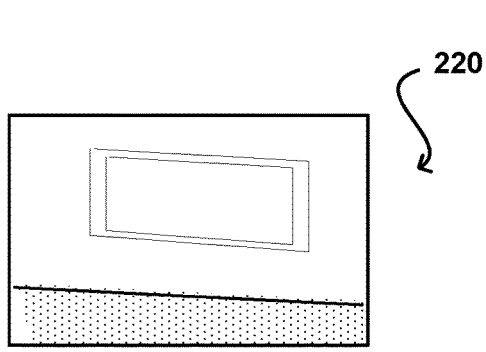
Figure 2C:
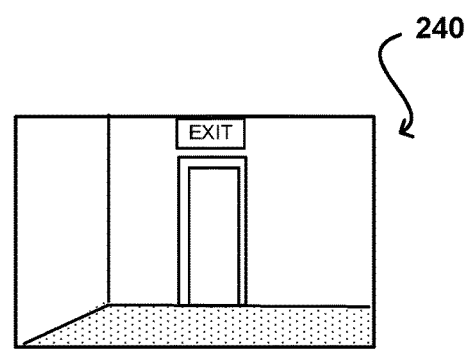
Figure 2D:
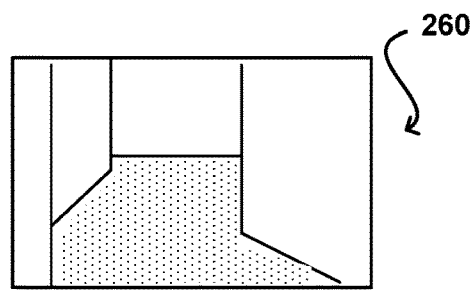

As an example, FIGS. 2A-2D illustrate a sensory data capture process that can be utilized in accordance with various embodiments. In the view 200 of FIG. 2A, the physical space of FIG. 1 is again presented. In this example, it is illustrated that the object 106 (or a different object) can follow one or more paths 202 through the navigable space 102. The navigation may be done manually, or using a simple sensor and boundary based navigation algorithm, among other such options. During the navigation, the object can capture image or video data at each of a number of different locations, where the data will be representative of a portion of the environment contained within a field of view of at least one camera or other such sensor. As discussed elsewhere herein, other types of sensory data can be captured as well, such as ultrasonic data, audio data, structured light data, and the like. FIGS. 2B, 2C, and 2D illustrate representative frames of image data 220, 240, 260 that can be captured at different locations 204, 206, 208, respectively, within the physical environment 102. As illustrated, the objects represented in the image frames captured at different locations will generally be significantly different for most environments. Unless the object is moving at a very high rate, a capture rate on the order of thirty or sixty frames per second would cause adjacent frames in the sequence to be captured at very similar locations, with very little distance between capture locations, such that much of the representation will be similar between the adjacent frames, with mostly a slight offset in feature locations being the difference.

Figure 3A:
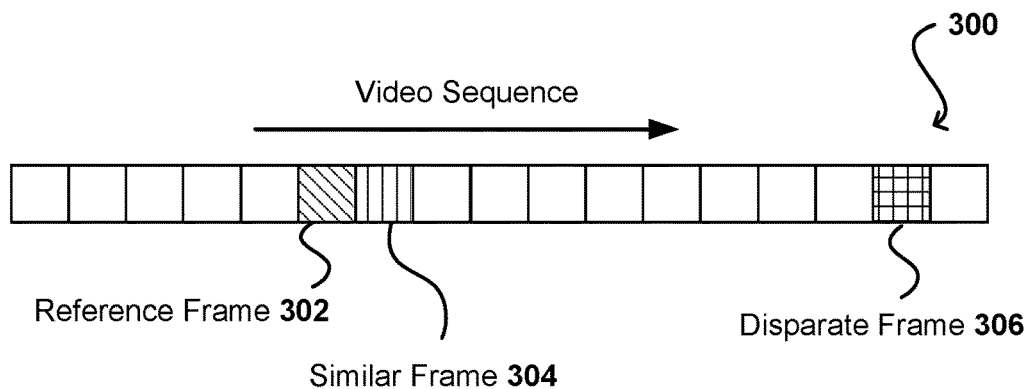
FIGS. 3A and 3B illustrate an approach to generating scene triplets for training an embedding network that can be utilized in accordance with various embodiments.
Figure 3B:
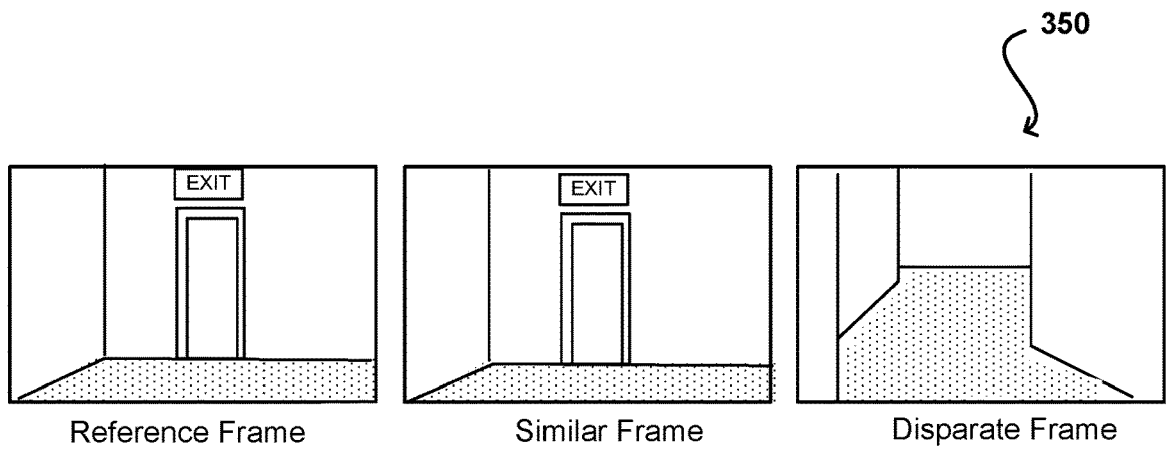

FIG. 3A illustrates an example video sequence that can be captured during such a process. As mentioned, the video sequence 300 can be captured while the capturing object is in motion through an environment, such that each frame will include a representation of a slightly different perspective of the environment based on the location at which the frame is captured. As discussed, sensory relatedness can be determined by analyzing image frames that are both similar and different. Accordingly, sets of image frame triplets can be generated for training as discussed in more detail elsewhere herein. In this example, a reference frame 302 is selected from the video sequence. As a number of training sets can be generated from the sequence, or set of sequences, the reference frame for each set can be selected at random or using an appropriate selection algorithm. In this example, an adjacent frame in the sequence can be selected as a similar frame 304 as the adjacent frame will have been captured at a similar location and orientation, and thus will have significant overlap in features represented in most instances. This may be the directly adjacent image frame or a frame within a maximum frame sequence distance, among other such options. Also illustrated is a disparate frame 306 that is selected from elsewhere in the video sequence. In various embodiments the disparate frame is selected using at least a minimum distance, capture time, or frame number from the reference frame 302, such that the features or objects represented in the disparate frame ideally have little to no overlap with those of the reference image. Thus, the threshold between reference and disparate frames may be based upon factors such as capture frame rate, speed of navigation of the capturing device, and relative size or complexity of the physical environment, among other such factors. FIG. 3B illustrates the example frames 350 selected for a training triplet. As mentioned, the views of the reference and similar frame are very similar, and would have substantially the same feature vectors generated. The disparate image is quite different, having been captured at a different location, and would have a very different feature vector generated. A large set of such triplets can be generated using such a process, which can then be used to train an embedding network as discussed herein.

Figure 4:
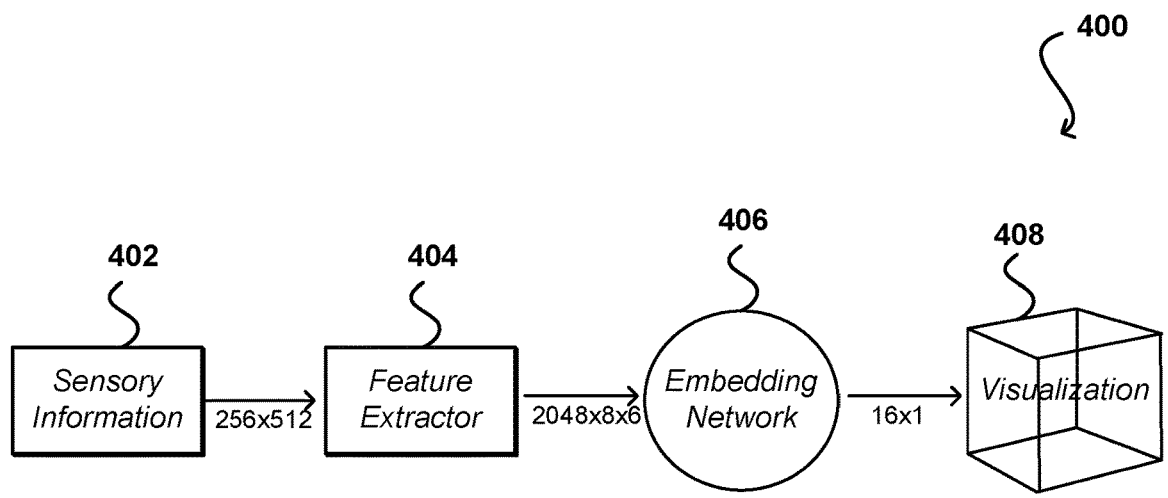
FIG. 4 illustrates an example process for generating a scene embedding that can be utilized in accordance with various embodiments.

A goal of such a process can be to capture sensory relatedness such that similar features map to nearby points in a vector space embedding. FIG. 4 illustrates components of a system 400 that can be utilized to implement such a process in accordance with at least one embodiment. As mentioned, sensory information 402 can be obtained in the form of a set of image triplets. The sensory information may have a first size, such as 256×512, that is based at least in part upon the resolution of the camera or sensor capturing the sensory data. This embedding can be realized by a feature extractor 404 using a deep convolutional neural network that is trained implicitly by imposing that neighboring features $(F_i, F_j)$ produced from discretized sensory data $(S_i, S_j)$ are separated by a small distance. That is, a metric space, $\xi \in \mathbb{R}^d$, is sought such that $\|\xi(F_i) - \xi(F_j)\|^2$ is minimized while at the same time attempting to maximize the separation $\|\xi(F_i) - \xi(F_k)\|^2$ between non-contiguous features derived from physically disjoint sensory input. The contrast of optimization objectives can prevent learning a degenerative 'null space' embedding where all features map to the zero vector. The feature vectors, having a second size, can then be fed to an embedding network 406 as training data. Such a process of feature extraction followed by feature embedding produces a 'relative space' representation, or visualization 408, that is topologically consistent with the latent structure of the sensory information and draws a compelling analogy with the complementary nature of the visual cortex and the hippocampus. A recurrent organization could also provide additional functionality and insight in at least some embodiments. The visualization as illustrated is also much smaller in size.

To analyze the structure of the embedded data within a two- or three-dimensional map, non-linear dimensionality reduction techniques such as Isomap, locally linear embedding (LLE), and stochastic neighbor embedding (t-SNE) can be leveraged. In a visualization process in accordance with various embodiments, no parameters are learned as the embedded data are effectively projected to two and three dimensions to more easily observe topological relationships realized during training of the embedding network.

In such an approach, it may be desirable to have a sensory data capture path return to one or more previously-visited locations, to provide closure and position relevance to the data, and to allow for slight errors in positioning or labeling of the data during the path traversal. As mentioned, in at least some embodiments it can be desirable to capture sensory data for multiple paths through an environment, as well as potentially duplicative paths, in order to obtain additional data and/or improve precision. Further, in coming full circle and achieving closure, a global structure is revealed leading to a topological 'folding' or metric 'collapse' where points once far apart are subsequently in close proximity. Similarly, changing orientation at the same physical location produces different visual cues which can subvert closure. That is, traversal of the same closed path in different directions can produce a 'fractured' topological representation whereby clockwise and counter-clockwise traversals are represented separately within the embedding.

A cognitive mapping scheme shares numerous analogues with the subjective experiences associated with learning. For example, initially a new and unfamiliar city seems large and confusing but over time through exploration and repetition a compact and coherent representation is achieved. Furthermore, landmarks play a crucial role in providing constant visual features for reference which analogously provide strong topological constraints during optimization. Finally, in an online continuous learning configuration, without infinite capacity, new sensory information affects the embedding of previous experiences in a kind of representational drift. That is, the processing of new information naturally leads to a reinterpretation of the past.

Neural networks can capture activations resembling grid cell activity, but it should be emphasized that localization is an intrinsic bi-product of the scene embedding approach. Moreover, the embedding naturally yields goal-directed vectors and distance representations for vector-based navigation without the need to model multi-scale periodic grid cells or conjure their emergence. Just as convolutional neural networks have facilitated the understanding of the visual cortex, embedding networks demonstrate the potential for artificial intelligence algorithms to advance understanding of the brain. While applications using visual sensory data are presented, there are no mathematical or other limitations in generalizing this cognitive mapping approach for other sensory modalities (e.g. radar, sonar), sequential data (e.g. video, audio, text), and so on, given an appropriate feature extraction mechanism. Likewise, this ability to capture the latent interconnectedness of information provides foundational support for unsupervised learning in areas such as motor-control, memory, and planning.

Figure 5:
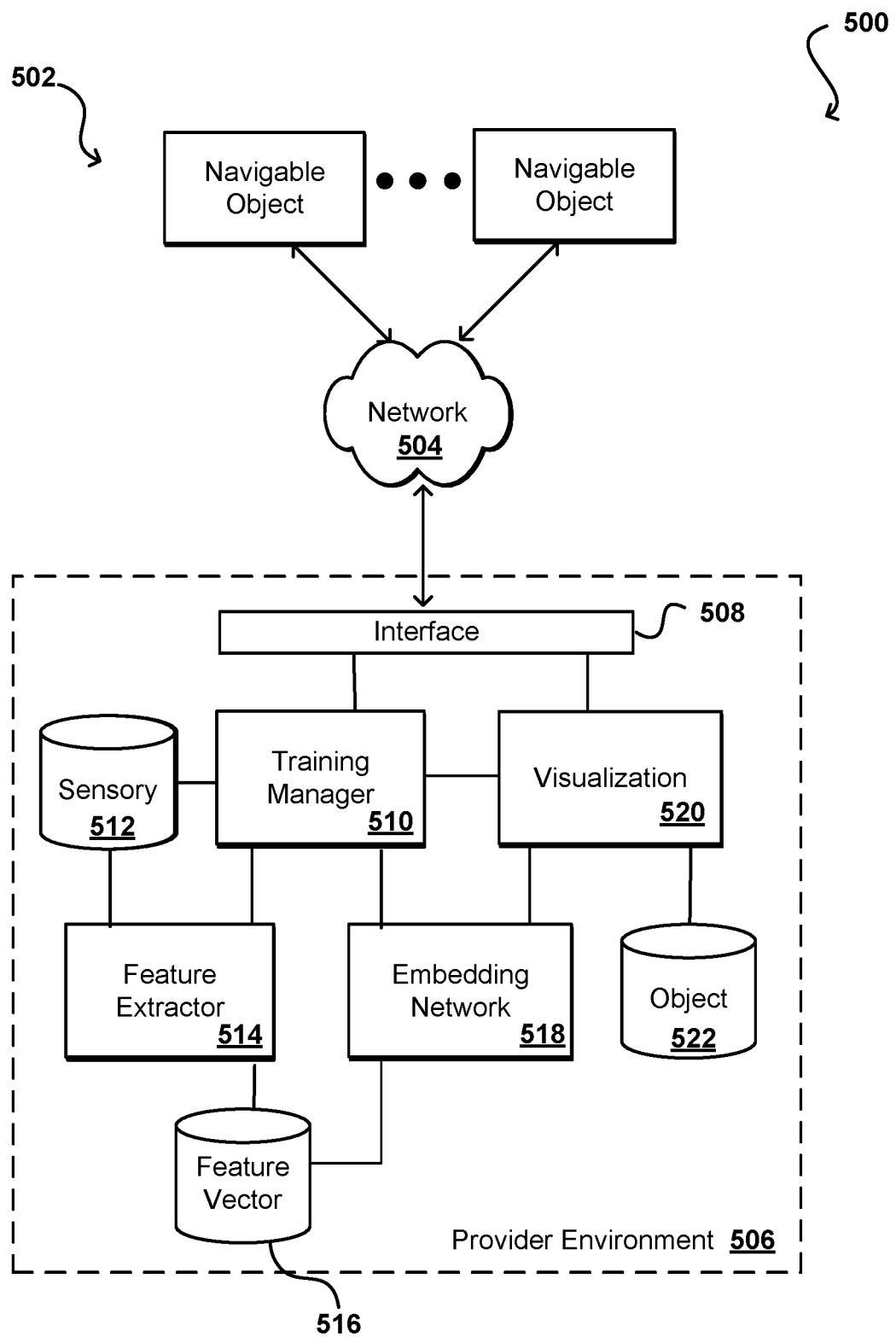
FIG. 5 illustrates a system that can be used to train and utilize a scene embedding network in accordance with various embodiments.

FIG. 5 illustrates an example system 500 that can be utilized to implement aspects of the various embodiments. In this example one or more navigable objects 502 can communicate across at least one network 504 to leverage functionality and resources of a provider environment 506, although in other embodiments the functionality may be provide by the objects themselves or locally through a navigation system, among other such options. In this example, one or more navigable objects 502 can collect sensory data for an environment. The objects may be any appropriate objects as discussed herein, as may include robots, autonomous vehicles, unmanned aircraft, and the like. In some embodiments a computing device might communicate over the network, and communicate separately with the navigable object. The objects can include one or more sensors or other mechanisms for capturing sensory data, such as one or more cameras for capturing image data or video as discussed elsewhere herein. The at least one network 504 can include any appropriate network, including an intranet, the Internet, a cellular network, a local area network (LAN), or any other such network or combination, and communication over the network can be enabled via wired and/or wireless connections. The provider environment 506 can include any appropriate components for receiving requests and returning information or performing actions in response to those requests. As an example, the provider environment might include Web servers and/or application servers for receiving and processing requests, then returning data or other content or information in response to the request.

Communications received to the provider environment 506 can be received to an interface layer 508. The interface layer 508 can include application programming interfaces (APIs) or other exposed interfaces enabling a user to submit requests to the provider environment. The interface layer 508 in this example can include other components as well, such as at least one Web server, routing components, load balancers, and the like. Components of the interface layer 508 can determine a type of request or communication, and can direct the request to the appropriate system or service. For example, if the communication from the navigable object 502 is a video file captured for the environment, the video file can be caused to be stored to a sensory repository 512 that is accessible to a model training manager 510. It should be understood that in some embodiments the video data might be processed on the navigable object and feature vectors or other representations sent that will require the transmission of significantly less data.

In order to generate a visualization of the environment, one or more files or sets of sensory data can be pulled from the sensory repository 512 by the training manager 510. The training manager 510 can pass this data to a feature extractor, or can have the feature extractor access the data directly from the sensory repository 512. The feature extractor in this example can analyze individual image frames using a deep convolutional neural network to obtain a set of feature vectors for sets (i.e., triplets) of image frames. In other embodiments the feature extractor can extract the feature vectors for all frames, which can then be selected for relevant image frame sets. The feature vectors can be stored, at least temporarily, in a feature vector repository 516. The training manager 510 can then cause the relevant feature vectors to be used to train an embedding network 518. As mentioned, frame triplets can be formed during the training of the embedding network. A hyperparameter τ can be used to define temporal closeness. A goal of triplet-loss is to pull close similar samples and push away dissimilar information, such that the distance to positive examples is less than the distance to negative examples. A cognitive mapping workflow can utilize two separate networks, trained with different objectives, to extract features and then relate those features in space and time. Accordingly, once the feature vectors are extracted an embedding network 518 can be used to relate those features in the environment. A visualization component 520 can also be used to validate the embedding (i.e., see the learned relationships). As mentioned, the result will be a representation that is spatially consistent with the physical environment. Such an approach effectively generates a map of the environment using one or more streams of sensory data. When one of the navigable objects 502 then needs to obtain destination information, the object can provide an image captured of its current location and image data for a target destination, where the navigable device might provide the image data for the destination or provide information about the destination that can be used to locate the image data, among other such options. The image data can then be processed using the embedding network 518 and visualization service 520 to determine the relevant feature vectors and then determine the locations from the visualization of the environment. A navigation vector can then be provided that corresponds to a path from the current location to the destination. In this example, information about the object itself might be stored to an object repository 522, which can be helpful in determining navigation instructions for the object, as may be based upon physical characteristics or limitations of the specific device. In this example the navigation vector can be provided back to the navigable device, which can utilize local navigation capabilities to determine how to best navigate to the destination defined by the navigation vector. In other embodiments the navigation instructions may be at least partially determined by in the resource environment and provided to the appropriate navigable object.

Figure 6:
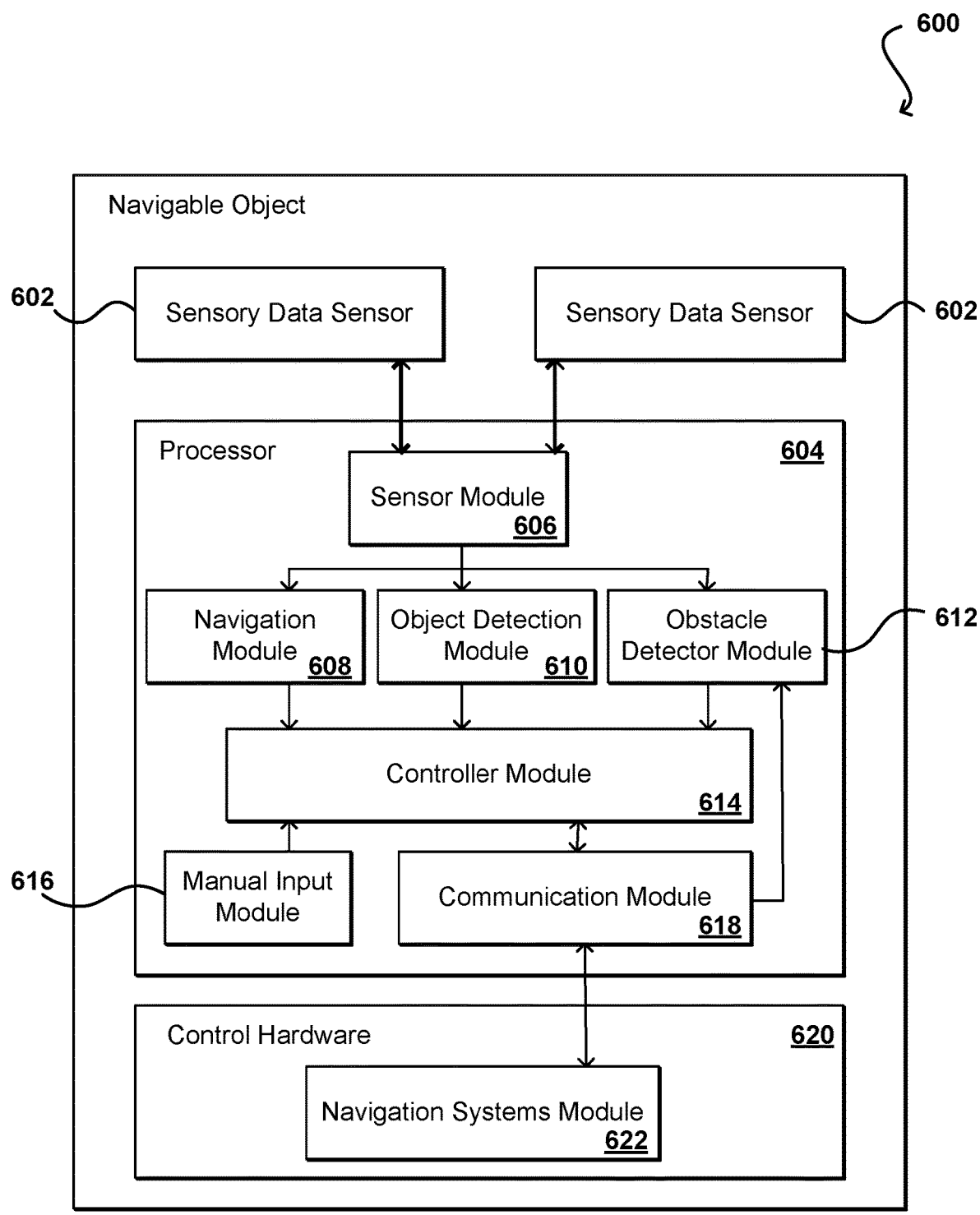
FIG. 6 illustrates an example object that can utilize navigation instructions generated using an embedding network in accordance with various embodiments.

FIG. 6 illustrates an example navigable object 600 that can take advantage of, or implement, aspects of the various embodiments. As mentioned, such an object might be a robot, autonomous vehicle, unmanned aerial vehicle, or other device capable of being moved (automatically, semi-automatically, or manually according to navigation instructions) from one location to another. Such an object may perform various tasks described herein, or may utilize external computing resources to perform at least some of the tasks, as discussed with respect to the system of FIG. 6. In this example, the object 602 can include one or more sensory data sensors 602, or sensor assemblies, that are able to capture sensory data for use in environment visualization and navigation. As mentioned, this may include one or more cameras, microphones, ultrasonic sensors, structured light assemblies, and the like. The sensor data can be collected and provided to one or more processors 604 on the device. As mentioned, there may be separate training and navigation steps, and the processor 604 can be used for either or both of these steps.

The processor can assist with performing autonomous navigation using deep neural networks, according to one embodiment. As shown, the processor 604 includes a sensor module 606 that is able to receive (or otherwise obtain) sensory data from the sensory data sensors 602. The data from the sensors can be provided to different components for different purposes. In this example, the sensory data can be fed to a navigation module 608, an object detection module 610, and an obstacle detector module 612. In one embodiment, the sensor module 606 may provide visualization data (e.g., image data, radar data, depth data, LIDAR data, infrared data, sonar data, etc.) to the modules. In another embodiment, the sensor module may manage one or more cameras of a variety of different types within the object.

In one embodiment, the navigation module 608 may obtain the sensor data and process the sensor data using the embedding network and visualization discussed herein to obtain a navigation vector. In other embodiments, the navigation module 608 might send the data to a remote computing system, which can then send back the determined navigation vector, among other such options discussed and suggested herein. In one embodiment, the object detection module 610 may receive visualization data from the sensor module 606, and may output an indication as to whether an object (e.g., a person, other vehicle, or boundary) is present within the visualization data (e.g., utilizing a DNN such as a YOLO DNN, etc.). In another embodiment, the obstacle detector module 612 may receive visualization data from the sensor module 606, and may output a set of weights indicating a likelihood of obstacles at various locations and distances (e.g., utilizing simultaneous location and mapping (SLAM), etc.). In this way, the obstacle detector module 612 may provide information about a relative location of static objects within the scene. Thus, the navigation module can provide information about a distance and direction to the destination, and the object detection and obstacle detection modules can provide real-time data to help navigate the vehicle around various obstacles to arrive at the destination. As mentioned, in some embodiments the navigation system takes the navigation vector as input and attempts to minimize the vector through movements of the vehicle as limited by the objects and obstacles detected.

The object illustrated includes a controller module 614. In one embodiment, the controller module 614 may receive information about the current and destination locations in the environment from the navigation module 608 and may create navigation directions (e.g., a steering angle for the vehicle, etc.), utilizing the location information and/or vector. The communication module 618 may receive the navigation directions in a first format (e.g., a ROS protocol, etc.) from the controller module 614, and may convert them to messages in a second format (e.g., a MAV protocol, etc.). The communication module 618 may then broadcast the converted messages in the second format to a navigation systems module 622 of the control hardware, utilizing a communication protocol. In addition, in one embodiment, the navigation systems module 622 may receive the converted messages, and may use such messages to control one or more physical components of the vehicle (e.g., in order to control movement of the vehicle, etc.). These components can include steering, motor, or propulsion units, among other such options. In this way, the controller module 614 may compute navigation directions and send the directions to the communication module 618, which may convert the directions to a different format and send them to the navigation systems module 622 for implementation at the navigable object.

Further, the example object 600 includes a manual input device module 616. The manual input device module 616 may receive input from a user (e.g., a startup indicator, a kill switch selection, a manual override selection, etc.), and may send such information to the controller module 614. In this way, manual user input may be provided to the object 600. Further still, the modules illustrated may all be implemented within a single processor 604 or can be implemented using multiple processors that may be of different types. Communication between such modules may be made using a predetermined protocol (e.g., a ROS protocol, etc.). The navigation systems module 622 in this example is implemented within control hardware 620 that is separate from the processor 604.

In various embodiments the processor 604 will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

Figure 7:
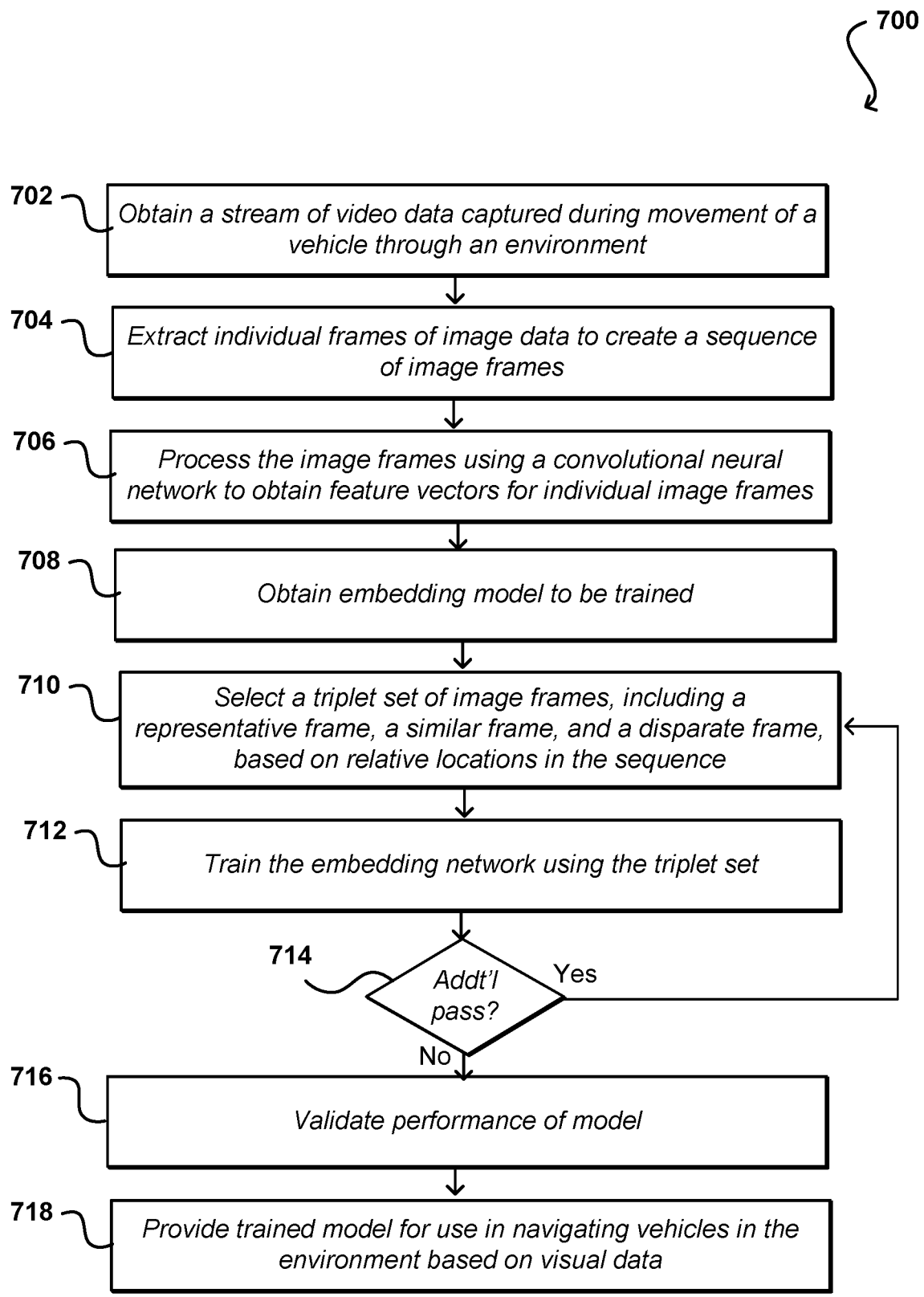
FIG. 7 illustrates an example process for training an embedding network that can be utilized in accordance with various embodiments.

FIG. 7 illustrates an example process 700 for training an embedding model using sensory data representative of an environment that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a stream of video data is obtained 702, where the video data was captured by a vehicle (or other navigable device or object) as the vehicle navigated through the environment. Other sensory data may be obtained as well, as may include audio, LIDAR, or ultrasonic data as discussed herein. For video data, data for individual segments can be extracted 704 to generate one or more sequences of image frames. The image frames can be processed 706 using a feature extractor such as a convolutional neural network (CNN) to obtain feature vectors representative of those image frames. Some or all of the image frames in the sequence may be processed as discussed herein. A based CNN, or other such model or network, can be obtained 708 that is to be used for training.

In order to train the model, sets of triplets of the image frames are generated. Each triplet can include a representative image frame selected at random from a given sequence. A similar image frame is selected that is positioned adjacent (in the sequence or an image buffer, for example), or otherwise close to, the representative frame in the sequence. Due in part to the temporal proximity, the similar image frame will include a representation of a portion of the environment that is very similar to that included in the representative frame. To complete the triplet, a disparate image frame is selected that is at least a minimum distance away from the representative frame, such that the content of the disparate image will be substantially different from the content represented in the representative image. When training the model, distance vectors for the representative and similar frames should be close together, while distance vectors for the representative frame and the disparate frame should be spaced apart. The distance vectors can provide a sense or implicit representation of the relatedness of the visual information that is coming in. As mentioned, the feature vectors may already be extracted for the image frames before the triplets are selected, or can be extracted as the triplet image frames are processed, among other such options.

Once at least a portion of the set of triplets is generated, a triplet can be selected 710, and that triplet can be used to train 712 the embedding model. A triplet loss function can be used in the training, and the loss values can be used to determine when the model converges or another termination criterion is reached. If an additional training pass is to be performed, or if there are additional triplets to be selected for the current pass, then another triplet can be selected and the process can continue. Once a termination criterion is met, such as convergence or a maximum number of training passes as discussed herein, the performance of the model can be validated 716, such as by using a validation portion of the training set. If performance of the model satisfies the relevant performance criterion, such as by producing acceptable triplet loss values, then the trained model can be provided 718 for use in navigating vehicles, or other such objects, in the environment based at least in part upon visual data.

Figure 8:
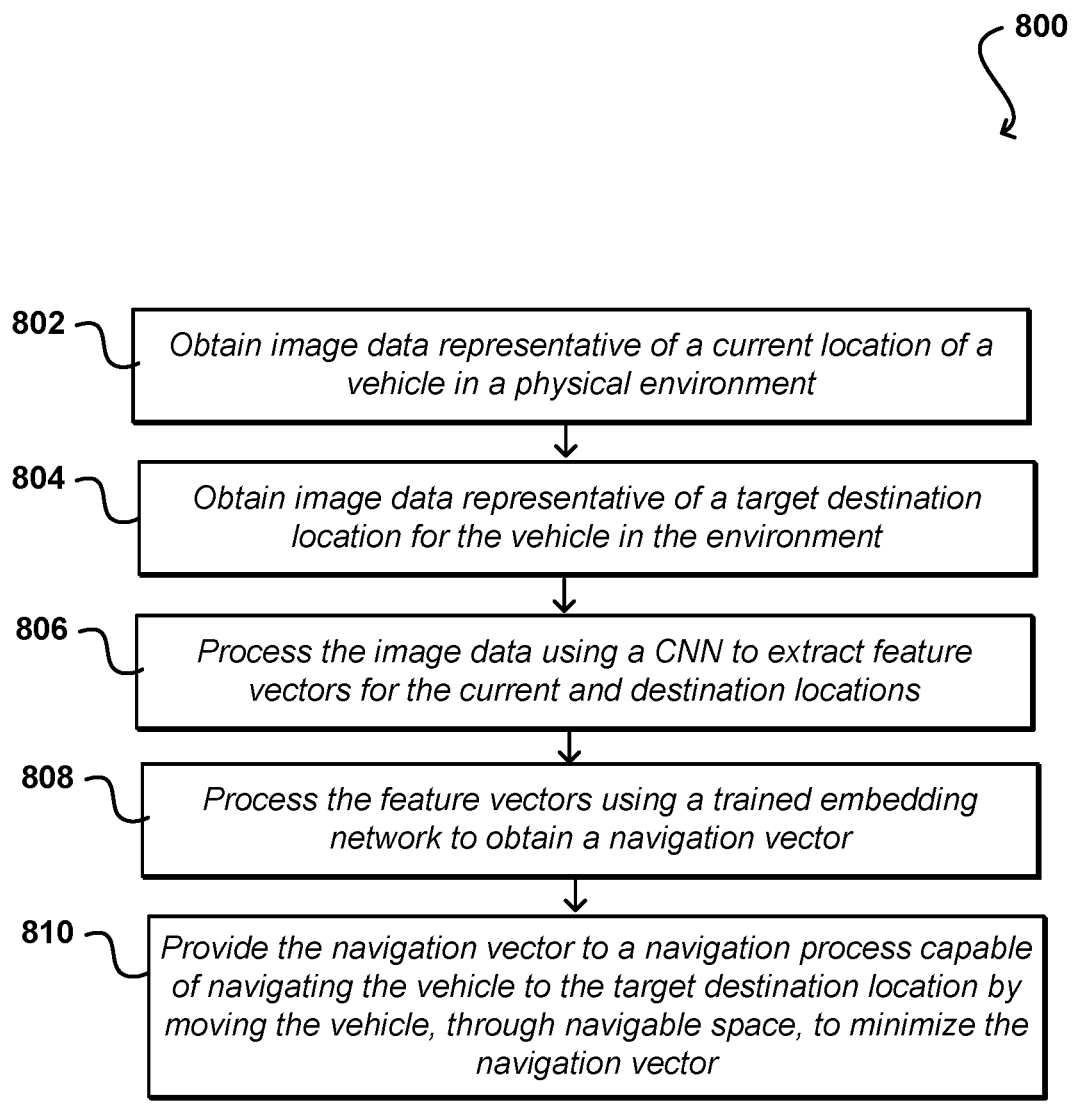
FIG. 8 illustrates an example process for utilizing a trained embedding network for navigation in accordance with various embodiments.

FIG. 8 illustrates an example process 800 for navigating using sensory data representative of an environment that can be utilized in accordance with various embodiments. In this example, a vehicle or other object is to be moved from a current location to a target destination location. Image data representative of the current location of the object is obtained 802, such as by the object capturing a picture from its current location and providing the image data. Image data for the target destination can also be obtained, whether from the object or from a computing system in communication with the object or responsible for guiding the object in the environment. This may include, for example, an image or feature vector associated with the destination. The image data can be processed 806 using a feature extractor, such as a trained CNN, to extract feature vectors for the current and destination locations, unless the vector for the destination has already been obtained. The feature vectors can then be processed 808 using the trained embedding network to obtain a navigation vector indicating a direction and distance from the current location to the target destination location. The navigation vector can then be provided 810 to a navigation process, service, or system that is capable of navigating the object or vehicle in the environment. This can include, for example, providing the navigation vector to a processor on the object that is able to utilize sensor data to navigate the vehicle through the environment by avoiding objects and obstructions while attempting to minimize the navigation vector. Such an approach enables navigation from a current location to a target location based on visual data, independent of any coordinates or other location information being provided or determined. Such an approach also enables a vehicle to locate itself in an environment based solely on visual data available at that location.

In one example, video data was captured using a dash cam in a vehicle, where the camera used a capture rate of 30 frames per second and the vehicle moved at a speed such that adjacent frames had significant overlap in content. Individual frames were extracted to make a sequential dataset. A large number of triplets were created from the dataset. The embedding model was trained using the triplet sets by contrastive learning with triplet loss. The training works by pulling similar vectors together and separating disparate vectors in embedding space (vectors with negative inferences). Once the training has completed, the only representation that will satisfy the learned constraints is an accurate representation that is topologically consistent with the physical environment.

In various examples, the embedding network is a higher dimension network. In one embodiment the embedding network has sixteen dimensions. A visualization process can be utilized to visualize the data from these higher dimensions. The data, however, can remain in these higher dimensions. In some embodiments, the trained model can be loaded on a robot that is to move within that environment. The robot can then navigate by capturing image data of its current location and feeding that image data (or the corresponding feature vectors) to the trained embedding network. It should also be mentioned that the CNN for feature extraction and the CNN for the embedding can be trained or optimized in very different ways. The shape of the embedding network is a CNN, similar to that of the feature extractor. The very distinct difference is that the models are trained on two completely different objective functions. The objective function for the embedding network relates to triplet loss and attempts to constrain based on the time and space organization of the input data, whereas the feature extractor CNN is trained on something more traditional, like ImageNet or other image recognition data. All training may be GPU accelerated as discussed herein.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying, different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 9:
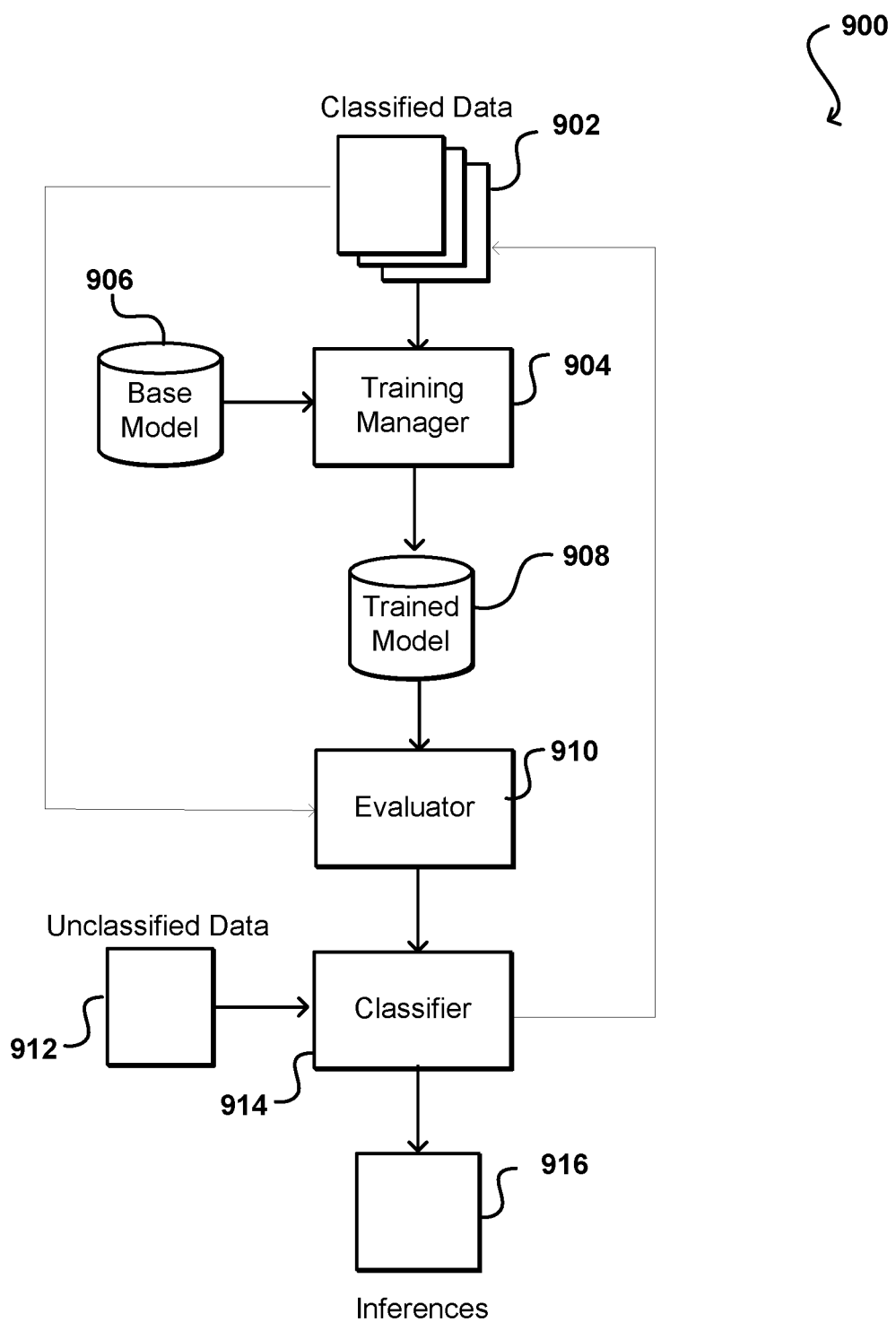
FIG. 9 illustrates a system for graining a machine learning model that can be utilized in accordance with various embodiments.

FIG. 9 illustrates an example system 900 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 902 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 902 in this example is provided as training input to a training manager 904. The training manager 904 can be a system or service that includes hardware and software, such as one or more computing devices executing a training application, for training the statistical model. In this example, the training manager 904 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 904 can select a base model, or other untrained model, from an appropriate repository 906 and utilize the classified data 902 to train the model, generating a trained model 908 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 908 can be provided for use by a classifier 914 in classifying unclassified data 912. In many embodiments, however, the trained model 908 will first be passed to an evaluator 910, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the classified data 902 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 908 and the evaluator 910 can determine the accuracy of the model by comparing the ground truth data against the corresponding output (or predictions/observations) of the model. The evaluator 910 in some embodiments can provide a summary or performance metric indicating how well the predicted and true values match. If the trained model does not satisfy at least a minimum performance criterion, or other such accuracy threshold, then the training manager 904 can be instructed to perform further training, or in some instances try training a new or different model, among other such options. If the trained model 908 satisfies the relevant criteria, then the trained model can be provided for use by the classifier 914.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 900 of FIG. 9, the trained model 910 after evaluation is provided, or made available, to a classifier 914 that is able to use the trained model to process unclassified data. This may include, for example, data received from users or third parties that are not classified, such as query images that are looking for information about what is represented in those images. The unclassified data can be processed by the classifier using the trained model, and the results 916 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 908 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 10:
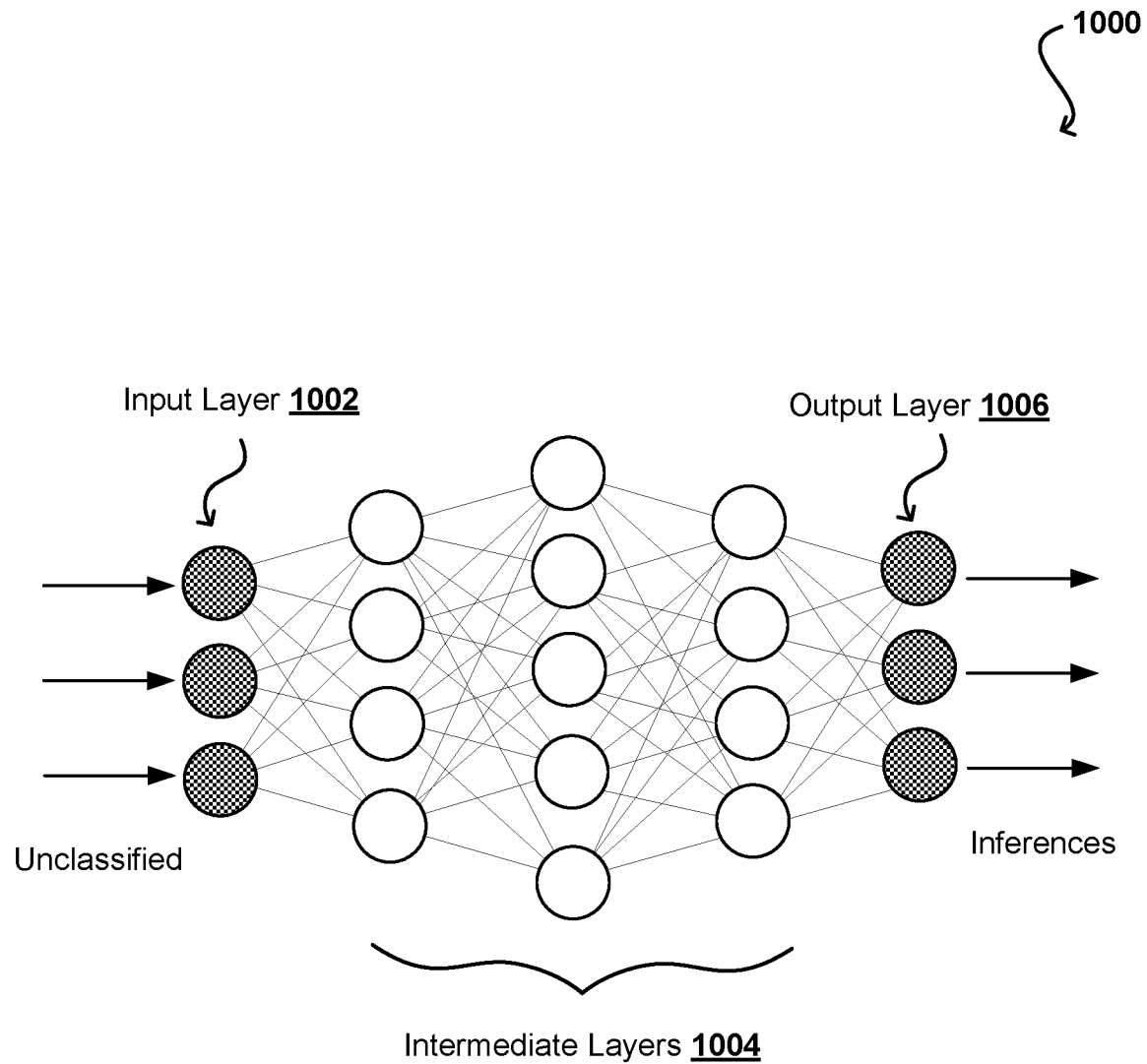
FIG. 10 illustrates layers of an example statistical model that can be utilized in accordance with various embodiments.

FIG. 10 illustrates an example statistical model 1000 that can be utilized in accordance with various embodiments. In this example the statistical model is an artificial neural network (ANN) that includes a multiple layers of nodes, including an input layer 1002, an output layer 1006, and multiple layers 1004 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 11:
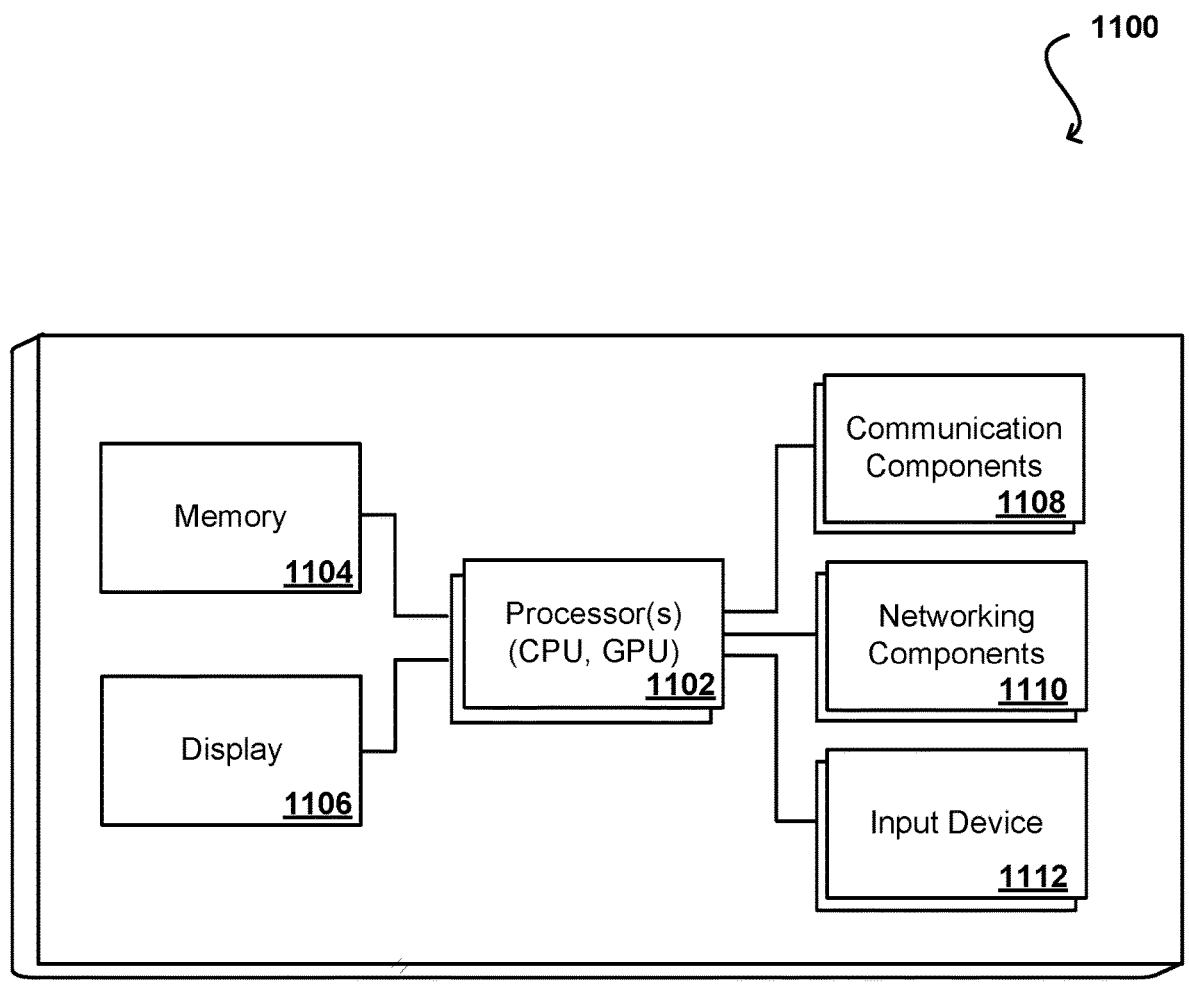
FIG. 11 illustrates example components of a computing device that can be used to implement aspects of the various embodiments.

FIG. 11 illustrates a set of basic components of a computing device 1100 that can be utilized to implement aspects of the various embodiments. In this example, the device includes at least one processor 1102 for executing instructions that can be stored in a memory device or element 1104. As would be apparent to one of ordinary skill in the art, the device can include many types of memory, data storage or computer-readable media, such as a first data storage for program instructions for execution by the processor 1102, the same or separate storage can be used for images or data, a removable memory can be available for sharing information with other devices, and any number of communication approaches can be available for sharing with other devices. The device typically will include some type of display element 1106, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1108, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1110 enabling the device to communicate with remote systems or services such as content providers and rights determining systems. These components can include, for example, wired or wireless communication components operable to communicate over a network such as a cellular network, local area network, or the Internet. The device can also include at least one additional input device 1112 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing video data representative of different views of an environment;
    segmenting the video data into a sequence of image frames;
    generating a set of frame triplets, each frame triplet including a representative image frame, a similar image frame adjacent the representative image frame in the sequence, and a disparate image separated by a number of image frames in the sequence;
    training a convolutional neural network using the set of frame triplets to obtain a trained embedding network;
    capturing an origination image representative of a current location of a device to be navigated;
    obtaining a destination image representative of a target destination in the environment;
    processing the origination image and the destination image using the trained embedding network to obtain a navigation vector indicating a relative distance and direction of the target destination relative to the current location; and
    providing the navigation vector to a navigation application to enable the device to be translated to the target destination.

2. The computer-implemented method of claim 1, further comprising:
    processing the image frames of the image frame triplets using a feature extractor to generate a respective feature vector representative of each of the processed video frames, the convolutional neural network being trained using the respective feature vectors for the set of frame triplets.

3. The computer-implemented method of claim 1, further comprising:
performing a visualization for the navigation vector in three dimensions, the trained embedding network being in more than three dimensions.

4. The computer-implemented method of claim 1, further comprising:
obtaining the navigation vector based on the origination image and the destination image without any physical location information for the device to be navigated.

5. The computer-implemented method of claim 1, further comprising:
causing the video data to be captured over a set of paths through the environment, each path returning to at least one previously-visited location in the environment.

6. A computer-implemented method, comprising:
obtaining first image data representative of a current location of an object in a physical environment;
obtaining second image data representative of a destination location for the object in the physical environment;
processing the first image data and the second image data using a trained embedding network, the trained embedding network trained using a set of image triplets, the image triplets each including image data for a representative image, a similar image, and a disparate image representative of respective portions of the physical environment; and
receiving, from the trained embedding network, a navigation vector indicating a relative direction and distance to the destination location from the current location of the object.

7. The computer-implemented method of claim 6, further comprising:
capturing video data representative of different views of the physical environment;
segmenting the video data into a sequence of image frames;
generating the set of image triplets, each image triplet including the representative image frame, the similar image frame that is adjacent the representative image frame in the sequence, and the disparate image that is separated by a number of image frames in the sequence; and
training a convolutional neural network using the set of image triplets to obtain the trained embedding network.

8. The computer-implemented method of claim 7, further comprising:
navigating a vehicle along multiple paths through the physical environment, the vehicle having at least one camera for capturing the video data.

9. The computer-implemented method of claim 7, further comprising:
capturing additional sensory data at various locations in the physical environment; and
training the embedding network further based on the additional sensory data.

10. The computer-implemented method of claim 7, further comprising:
processing the image frames of the image triplets using a feature extractor to generate a respective feature vector representative of each of the processed video frames, the embedding network being trained using the respective feature vectors for the set of image triplets.

11. The computer-implemented method of claim 10, wherein at least one of the feature extractor or the trained embedding network is a convolutional neural network.

12. The computer-implemented method of claim 6, further comprising:
training the embedding network using a large-margin nearest-neighbor technique accounting for triplet loss.

13. The computer-implemented method of claim 6, further comprising:
performing a visualization for the navigation vector in three dimensions, the trained embedding network being in more than three dimensions.

14. The computer-implemented method of claim 6, further comprising:
obtaining the navigation vector based on the first image data and the second image data without any physical location information for the device to be navigated.

15. The computer-implemented method of claim 6, wherein the trained embedding network provides a visualization that is topologically consistent with the physical environment.

16. A system, comprising:
at least one processor; and
memory including instructions that, when executed by the at least one processor, cause the system to:
obtain first image data representative of a current location of an object in a physical environment;
obtain second image data representative of a destination location for the object in the physical environment;
process the first image data and the second image data using a trained embedding network, the trained embedding network trained using a set of image triplets, the image triplets each including image data for a representative image, a similar image, and a disparate image representative of respective portions of the physical environment; and
receive, from the trained embedding network, a navigation vector indicating a relative direction and distance to the destination location from the current location of the object.

17. The system of claim 16, wherein the instructions when executed further cause the system to:
capture video data representative of different views of the physical environment;
segment the video data into a sequence of image frames;
generate the set of image triplets, each image triplet including the representative image frame, the similar image frame that is adjacent the representative image frame in the sequence, and the disparate image that is separated by a number of image frames in the sequence; and
cause a convolutional neural network to be trained using the set of image triplets to obtain the trained embedding network.

18. The system of claim 16, wherein the instructions when executed further cause the system to:
navigate a vehicle along multiple paths through the physical environment, the vehicle having at least one camera for capturing the video data.

19. The system of claim 16, wherein the instructions when executed further cause the system to:
provide the navigation vector to a navigation subsystem for navigating the object to minimize the navigation vector along a navigable space determined in part using data captured by one or more object sensors.

20. The computer-implemented method of claim 7, further comprising:
process the image frames of the image triplets using a feature extractor to generate a respective feature vector representative of each of the processed video frames, the embedding network being trained using the respective feature vectors for the set of image triplets.

* * * * *